(12) United States Patent
Lefebvre et al.

(10) Patent No.: US 7,194,320 B2
(45) Date of Patent: Mar. 20, 2007

(54) METHOD FOR IMPLEMENTING INDIRECT CONTROLLER

(75) Inventors: Wesley Curt Lefebvre, Boston, MA (US); Daniel W. Kohn, Boston, MA (US)

(73) Assignee: NeuCo, Inc., Boston, MA (US)

( * ) Notice: Subject to any disclaimer, the term of this patent is extended or adjusted under 35 U.S.C. 154(b) by 10 days.

(21) Appl. No.: 10/455,024

(22) Filed: Jun. 5, 2003

(65) Prior Publication Data

US 2004/0249480 A1 Dec. 9, 2004

(51) Int. Cl.
| | |
|---|---|
| G05B 13/02 | (2006.01) |
| G06F 19/00 | (2006.01) |
| G06F 15/00 | (2006.01) |
| G06F 15/18 | (2006.01) |
| G06E 1/00 | (2006.01) |
| G06E 3/00 | (2006.01) |

(52) U.S. Cl. ............................ 700/49; 700/31; 700/48; 700/50; 700/54; 700/109; 700/174; 702/84; 702/182; 706/14; 706/23; 706/25; 706/903

(58) Field of Classification Search ............... 700/28, 700/29, 31–33, 47–50, 54, 177, 173, 174, 700/108–110; 702/81–84, 182–185; 706/14–16, 706/19, 23, 25, 903, 904

See application file for complete search history.

(56) References Cited

U.S. PATENT DOCUMENTS

| | | | |
|---|---|---|---|
| 4,208,712 A | 6/1980 | Deutsch | |
| 4,965,742 A | 10/1990 | Skeirik | |
| 4,985,824 A * | 1/1991 | Husseiny et al. | 700/82 |
| 5,167,009 A | 11/1992 | Skeirik | |
| 5,212,765 A | 5/1993 | Skeirik | |
| 5,224,203 A | 6/1993 | Skeirik | |
| 5,237,939 A | 8/1993 | Spokoyny et al. | |
| 5,268,834 A | 12/1993 | Sanner et al. | |
| 5,282,261 A | 1/1994 | Skeirik | |
| 5,353,207 A | 10/1994 | Keeler et al. | |
| 5,386,373 A | 1/1995 | Keeler et al. | |
| 5,471,381 A * | 11/1995 | Khan | 700/48 |
| 5,493,631 A * | 2/1996 | Huang et al. | 706/23 |
| 5,543,116 A | 8/1996 | Bernstein et al. | |
| 5,704,011 A | 12/1997 | Hansen | |
| 5,781,432 A | 7/1998 | Keeler et al. | |
| 5,819,246 A | 10/1998 | Ashida et al. | |

(Continued)

OTHER PUBLICATIONS

Lin et al., "Hybrid Adaptive Fuzzy Control Wing Rock Motion System with H ∞ Robust Performance", Proceedings of the International Joint Conference on Neural Networks, vol.: 3, Jul. 20-24, 2003, pp.: 2372-2377.*

(Continued)

*Primary Examiner*—Crystal J. Barnes
(74) *Attorney, Agent, or Firm*—Wilmer Cutler Pickering Hale and Dorr LLP

(57) ABSTRACT

A system and method for implementing an indirect controller for a plant. A plant can be provided with both a direct controller and an indirect controller with a system model or a committee of system models. When the system model has sufficient integrity to satisfy the plant requirements, i.e., when the system model has been sufficiently trained, the indirect controller with the system model is automatically enabled to replace the direct controller. When the performance falls, the direct controller can automatically assume operation of the plant, preferably maintaining operation in a control region suitable for generating additional training data for the system model. Alternatively, the system model incorporates a committee of models. Various types of sources for errors in the committee of models can be detected and used to implement strategies to improve the quality of the committee.

15 Claims, 2 Drawing Sheets

U.S. PATENT DOCUMENTS

| | | | |
|---|---|---|---|
| 5,822,740 A * | 10/1998 | Haissig et al. .................. | 706/3 |
| 5,825,646 A | 10/1998 | Keeler et al. | |
| 6,002,839 A | 12/1999 | Keeler | |
| 6,038,540 A | 3/2000 | Krist et al. | |
| 6,063,292 A * | 5/2000 | Leung ........................ | 210/739 |
| 6,142,078 A * | 11/2000 | Lachajewski ............... | 101/484 |
| 6,241,435 B1 | 6/2001 | Huang et al. | |
| 6,243,696 B1 | 6/2001 | Keeler | |
| 6,256,983 B1 | 7/2001 | Yasui et al. | |
| 6,278,899 B1 | 8/2001 | Piche et al. | |
| 6,325,025 B1 | 12/2001 | Perrone | |
| 6,381,504 B1 | 4/2002 | Havener et al. | |
| 6,425,352 B2 | 7/2002 | Perrone | |
| 6,532,454 B1 | 3/2003 | Werbos | |
| 6,539,343 B2 | 3/2003 | Zhao et al. | |
| 6,577,908 B1 * | 6/2003 | Wojsznis et al. .............. | 700/42 |
| 6,583,964 B1 * | 6/2003 | Huang et al. ............ | 360/294.4 |
| 6,668,201 B1 * | 12/2003 | Bonissone et al. ............ | 700/50 |
| 6,678,585 B1 | 1/2004 | Havener | |
| 6,708,681 B2 | 3/2004 | Hosoya et al. | |
| 6,721,606 B1 * | 4/2004 | Kaji et al. .................... | 700/17 |
| 6,725,208 B1 | 4/2004 | Hartman et al. | |
| 6,736,089 B1 | 5/2004 | Lefebvre et al. | |
| 6,738,682 B1 * | 5/2004 | Pasadyn .................... | 700/100 |
| 6,757,579 B1 | 6/2004 | Pasadyn | |
| 6,823,675 B2 | 11/2004 | Brunell et al. | |
| 2003/0028266 A1 * | 2/2003 | Jacques ...................... | 700/32 |
| 2003/0109951 A1 | 6/2003 | Hsiung et al. | |
| 2003/0190603 A1 | 10/2003 | Larder et al. | |
| 2003/0195641 A1 * | 10/2003 | Wojsznis et al. | |
| 2003/0217021 A1 | 11/2003 | Jacobson | |
| 2004/0133531 A1 | 7/2004 | Chen et al. | |
| 2004/0170441 A1 * | 9/2004 | Forbes et al. | |
| 2004/0191912 A1 | 9/2004 | Bade et al. | |
| 2004/0225452 A1 * | 11/2004 | Campbell et al. ............ | 702/22 |
| 2006/0042461 A1 | 3/2006 | Boyden et al. | |
| 2006/0045800 A1 | 3/2006 | Boyden et al. | |
| 2006/0045801 A1 | 3/2006 | Boyden et al. | |
| 2006/0047526 A1 | 3/2006 | Boyden et al. | |
| 2006/0047607 A1 | 3/2006 | Boyden et al. | |

OTHER PUBLICATIONS

Chen et al., "Nonlinear Neural Network Internal Model Control with Fuzzy Adjustable Parameter", Proceedings of The IEEE International Conference on Industrial Technology, Dec. 2-6, 1996, pp.: 834-838.*

Shinskey, F.G., "Controlling Multivariable Processes", Instrument Society of America, 1981.

Shinskey, F.G., "Process Control Systems", McGraw-Hill, 1979.

Piche, et al., "Nonlinear Model Predictive Control Using Neural Network," IEEE Control Systems, pp. 53-62, Jun. 2000.

Henson, M. and Seborg, D., "Nonlinear Process Control," Prentice Hall, 1997.

Yen, "Optimal Tracking Control in Flexible Pointing STructures" IEEE COnference on Systems, Man and Cybernetics, Intelligent Systems for the 21st Century, 5:4440-4445 (1995).

Nakoneczney, et al., "Implementing B&W's Intelligent Sootblowing system at MidAmerican Energy Company's Louisa Energy Center Unit 1," Western Fuels conference, Aug. 12-13, 2002.

Rhode et al., "Tampa Electric's Neutral Network Based Intelligent Soorblowing," 4th Intelligent Sootblowing Workshop, Mar. 19-21, 2002.

Anonymous, "Intelligent Sootblowing at TVA's Bull Run Plant," Electric Power Research Institute, Dec. 2003.

Yen, "Decentralized Neural Controller Design for Space Structural Platforms", IEEE Conference on Systems, Man and Cybernetics, Human Information and Technology, 3:2126-2131 (1994).

Sarunac, et al., Sootblowing Optimization Helps Reduce Emissions from Coal-Fired Utility.

Anonymous, "Intelligent Sootblowing Demonstration at Texas Glenco's W.A. Parish Plant," Electric Power Research Institute, Dec. 2003.

Stallings, J., "Fifth Intelligent Sootblowing Workshop", Electric Power Research Institute, Jun. 2004, Palo Alto, CA.

Boyden et al, "Overlooked Opportunity: Advanced Process Control for Air Pollution Control Devices" Electric Utilities Environmental Conference, Tucson, AZ, Jan. 2004.

Boyden et al., "Advanced SCR Control for Dynamic Ammonia Distribution", Conference on Selective Catalytic Reduction and Non-Catalytic Reduction for NOx Control, Pittsburgh, PA, Oct. 2003.

Smith et al., "Combustion Optimization Case Studies and Emergin Applications" Combined Power Plant Air Pollutant control Mega Symposium, May 2003.

Piche, Stephen "Steepest Descent Algorithms for Neural Network Controllers and Filters" IEEE Transactions on Neural Networks, vol. 5, No. 2, Mar. 1994.

* cited by examiner

METHOD FOR IMPLEMENTING INDIRECT CONTROLLER

FIELD OF THE INVENTION

The invention relates generally to the control of industrial processes and specifically to methods for implementing indirect controllers for industrial processes.

BACKGROUND OF THE INVENTION

The control of an industrial process in a plant involves maintaining the process conditions at setpoints that are suitable to attain the desired process objectives. The control of industrial processes involves a series of steps, generally including: determining the desired process objectives; determining initial values for the process condition setpoints for the controllable process states; measuring the existing process conditions and adjusting control variables in accordance with the desired process condition setpoints; measuring the results in terms of the plant outputs and updating the process condition setpoints and/or the control variables to attain the desired process objectives.

The control variables are regulated by a controller that provides settings for the control variables as plant inputs to operate the plant. In a large plant, there may be a large number of inputs, with complex interactions between the inputs contributing to the output of the plant. The plant is generally non-stationary. One or more process conditions may vary constantly; the process typically will not reach a steady state. For example, a fossil-fuel furnace has properties that change over time; soot may accumulate in the furnace and require periodic cleaning. In order to maintain the desired process condition setpoints and satisfy the process objectives continuously, given the variation in process conditions, it is generally necessary to make adjustments repeatedly to the process condition setpoints and the corresponding control variables. Experimenting with different process conditions and different control variables to achieve the desired output typically requires high overhead, particularly in terms of time. In this dynamic environment, experimenting with different values may not even be possible. Direct measurement of the process conditions and the outcome of the process is often difficult to do effectively.

Using models of the process is one approach to addressing some of these control issues. An indirect controller uses a computer model of the process as a predictor of different values in the system. The model mimics the operation of the system. The model's ability to predict values in the system is useful for determining the result of various adjustments to the process inputs, including the control variables in the system, and conversely, determining the control variable settings necessary to achieve desired process outputs or process conditions. Accordingly, such models are useful for adjusting the inputs to the plant under the prevailing plant operating conditions. Neural networks are one such type of computer model that is useful to predict, control and optimize a process.

Indirect control schemes are typically implemented in two phases, wherein the system model is constructed first, followed by the construction of the controller and its corresponding control algorithms. The resulting controller provides the control laws for the plant. Subsequently, during execution, the controller investigates the system model to obtain optimal settings and then implements them using control algorithms. The system model can be retrained.

Indirect controllers may use any number of model architectures and adaptation methods. Given a model architecture, adaptation is used to develop the system model. A system model is typically trained by presenting it with training data values of the actual historical operation of the plant. One step that requires a significant investment of resources is the generation of the data used to train the system model. A system model is useful only if it predicts the operation of the plant with a high degree of accuracy. Ensuring the integrity of the system model is critical to optimizing the operation of the plant. To develop an accurate model, it is important to provide comprehensive test data.

One factor in the usefulness of a control system for a plant is its ability to adapt to the constantly (viewed over the long term) fluctuating relationship between the control variables, and process conditions setpoints and the outputs that characterize the plant. In indirect controllers, the system model itself may be adaptive in that it may be able to relearn and adjust the relationships between the plant variables. Two general classes of modeling methods that can be used in indirect controllers are adaptive in this sense: parametric adaptive and strictly non-parametric (with an adaptive architecture and adaptive parameters). In parametric adaptive modeling methods, the architecture is predetermined and the parameters are adaptive. Examples of parametric adaptive modeling methods include regressions and neural networks. Strictly non-parametric methods have no predefined architecture or sets of parameters or parameter values. One form of strictly non-parametric methods is commonly known as evolutionary (or genetic) programming. Evolutionary programming involves the use of genetic algorithms to adapt both the model architecture and its parameters. Evolutionary programming uses random, but successful, combinations of any set of mathematical or logical operations to describe the control laws of a process or to construct a system model.

An adaptive controller generally requires a mechanism by which the controller identifies the need to adapt. A known method to determine when to perform model adaptation is to initiate adaptation at predetermined scheduled times or at regular intervals. One disadvantage of this method is that it performs model adaptation in a predetermined manner, with no regard for when the model error is acceptable or unacceptable, which is inefficient, resulting in downtime for the plant or unnecessary use of computational resources.

One known method to operate the plant when the system model is not considered usable and even for initial training of the system model is to provide control by human operators. One disadvantage of this method is that human control is inadequate to truly optimize process control as a function of the large number of controllable variables that characterize complex plant operations and is subject to constraints such as variability from human to human, variability from day to day, and variability within the duration of an operator's shift.

There is a need for an improved method for providing for adaptation of an indirect controller. There is also a need for an improved method for modeling a system in an indirect controller. There is also a need for providing for coordination between a direct controller and an indirect controller.

SUMMARY OF THE INVENTION

Some embodiments of the present invention include a system for operating a plant that includes a direct controller and an indirect controller and provide a method for automatically selecting the preferred of the two and switching between them. The indirect controller incorporates a system model for control, which may have a variety of architectures, including a neural network or other nonlinear model architecture, such as those generated by the adaptive methods of genetic programming. When the system model in the indirect controller is not considered sufficiently accurate, control of the plant is regulated by the direct controller. Control may shift to the indirect controller when the system model has sufficient integrity. The transfer of control may be automatic.

In some embodiments of the invention, a plant can be provided with both a direct controller and an indirect controller with an untrained model such as a neural network or even an unspecified architecture, such as results from an untrained genetic programming modeling methodology. Initially, the plant is subject to direct control. The plant inputs are manipulated using the direct controller while the untrained system model observes the behavior of the plant. In one aspect of the invention, when the model has sufficient integrity to satisfy the plant requirements, i.e., when the model has been sufficiently trained, the indirect controller with the model is automatically enabled to replace the direct controller.

Another aspect of the invention is that the direct controller can be automatically enabled to replace the indirect controller, particularly if the integrity of the model is low, for example, when the model error is above a threshold. Another aspect of the invention is that fuzzy logic can be used to implement the decision process of switching between direct and indirect controllers. The system model in the indirect controller can be retrained, using data generated under the control of the direct controller, and then the indirect controller can again be automatically enabled to replace the direct controller.

In certain embodiments, an indirect controller incorporates a committee of models in place of a single system model. Aspects of the invention include methods for decision-making by the committee and methods for evaluating the integrity of the committee, and switching to direct control when the committee displays low performance. In certain embodiments, confidence intervals are used for evaluating the integrity of the committee of models.

Certain embodiments include the ability to identify the difference between certain statistical and random sources of error in the model in the indirect controller prior to switching to the direct controller. This information can be used to select optimal techniques for retraining or otherwise adapting the implementation of a model or committee of models.

These and other features and advantages of the present invention will become readily apparent from the following detailed description, wherein embodiments of the invention are shown and described by way of illustration of the best mode of the invention. As will be realized, the invention is capable of other and different embodiments and its several details may be capable of modifications in various respects, all without departing from the invention. Accordingly, the drawings and description are to be regarded as illustrative in nature and not in a restrictive or limiting sense, with the scope of the application being indicated in the claims.

BRIEF DESCRIPTION OF THE DRAWINGS

For a fuller understanding of the nature and objects of the present invention, reference should be made to the following detailed description taken in connection with the accompanying drawings, wherein.

DETAILED DESCRIPTION OF THE PREFERRED EMBODIMENTS

Embodiments of the present invention are directed to a method for implementing a system of indirect and direct controllers, in which plant control is automatically executed by the preferred of the two controllers.

Figure 1:
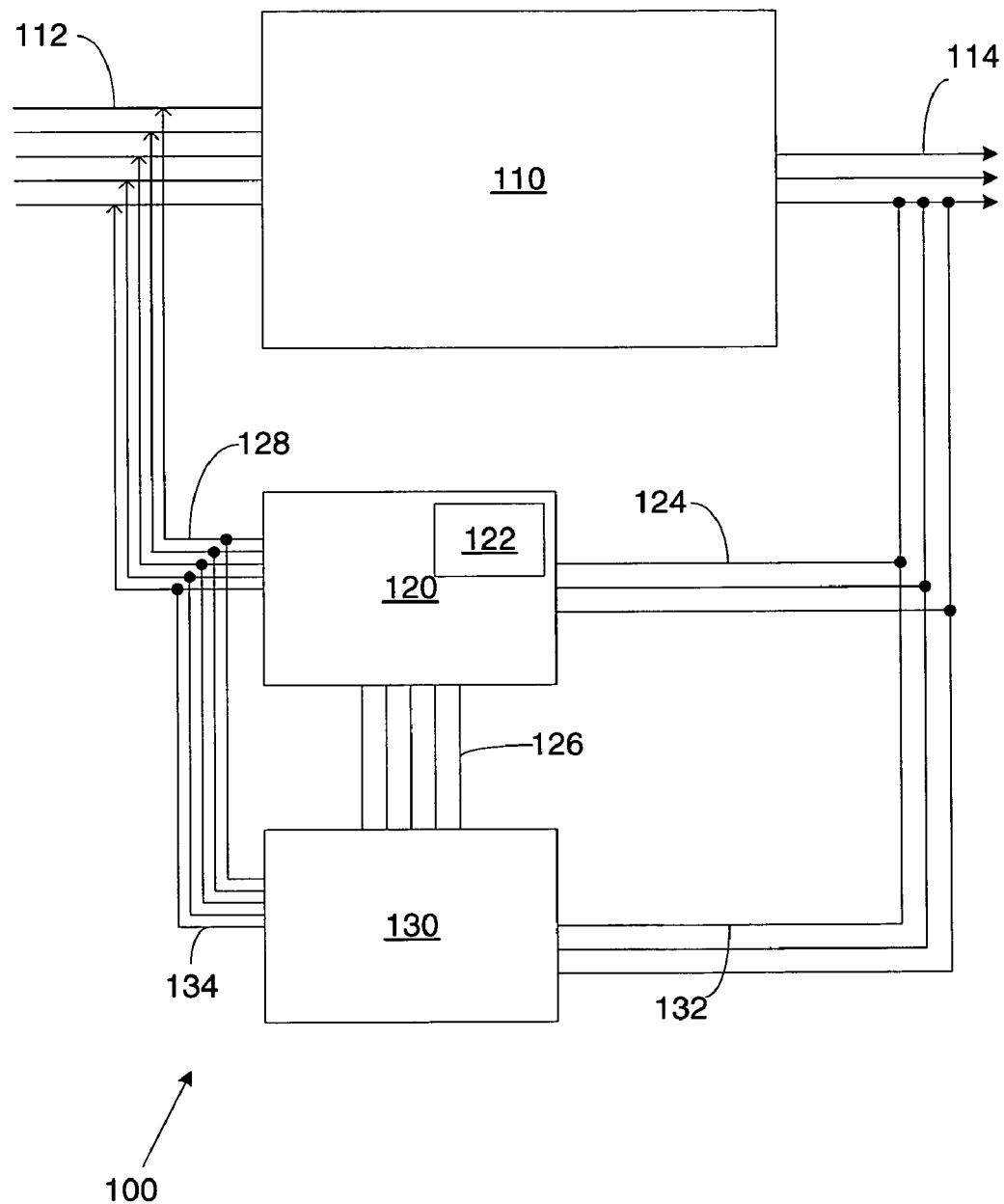
FIG. 1 is a diagram of a plant connected to a direct controller and an indirect controller.

Referring to FIG. 1, in accordance with an embodiment of the invention, a system 100 for carrying out an industrial process includes a plant 110. Plant 110 is operated using plant inputs 112 and produces plant outputs 114. System 100 also includes an indirect or model-based controller 120 that incorporates a computer system model 122 of the operation of the plant. Indirect controller 120 receives data about the operation of plant 100 at inputs 124 and provides control settings at outputs 128 for operating plant 110 in accordance with the plant process objectives. The control settings correspond to control variables in plant 110 and provide plant inputs 112 to plant 110. Initially, indirect controller 120 incorporates an untrained model 122 of the operation of plant 110. The inputs to model 122 include the current plant operating conditions and plant inputs 112; the outputs of model 122 include predicted plant performance values. For training, model 122 also observes the plant outputs 114. The system also includes a direct controller 130. Direct controller 130 provides as its outputs 134 control settings for the plant inputs 112. The direct controller 130 may also receive data about plant outputs 114 and plant operating conditions as inputs 132. Control of plant 110 is alternately regulated by direct controller 130 and indirect controller 120. Although it is preferred that plant 110 be operated under automated control provided by direct controller 130 and indirect controller 120 whenever possible, it is contemplated that from time to time, plant 110 will be subject to human control.

Data about the operation of plant 110 stored in an historical database could be used to train model 122. Alternatively, the data about actual plant operation used for training model 122 may be provided to model 122 in real time. Rather than using data values from an historical database, model 122 can observe the actual operation of plant 110, subject to the control of direct controller 130.

An initial step in implementing indirect controller 120 in accordance with an embodiment of the invention is to install direct controller 130 in the subject plant 110. This step will typically involve integrating direct controller 130 with the existing control system in plant 110. A second step is installing indirect controller 120 with untrained model 122. Subsequently, model 122 is trained by generating training data in plant 110 using direct controller 130. In training, model 122 receives data about the plant operating conditions, the plant inputs 112 and the actual plant outputs 114 for the given conditions and inputs. Data about the plant operating conditions may be obtained from a number of sources, including a performance monitoring system (not shown) that measures various values in the boiler and communicates data to indirect controller 120 and direct controller 130. When model 122 has been sufficiently trained, indirect controller 120 can be automatically enabled to replace direct controller 130 and operate plant 110.

Figure 2:
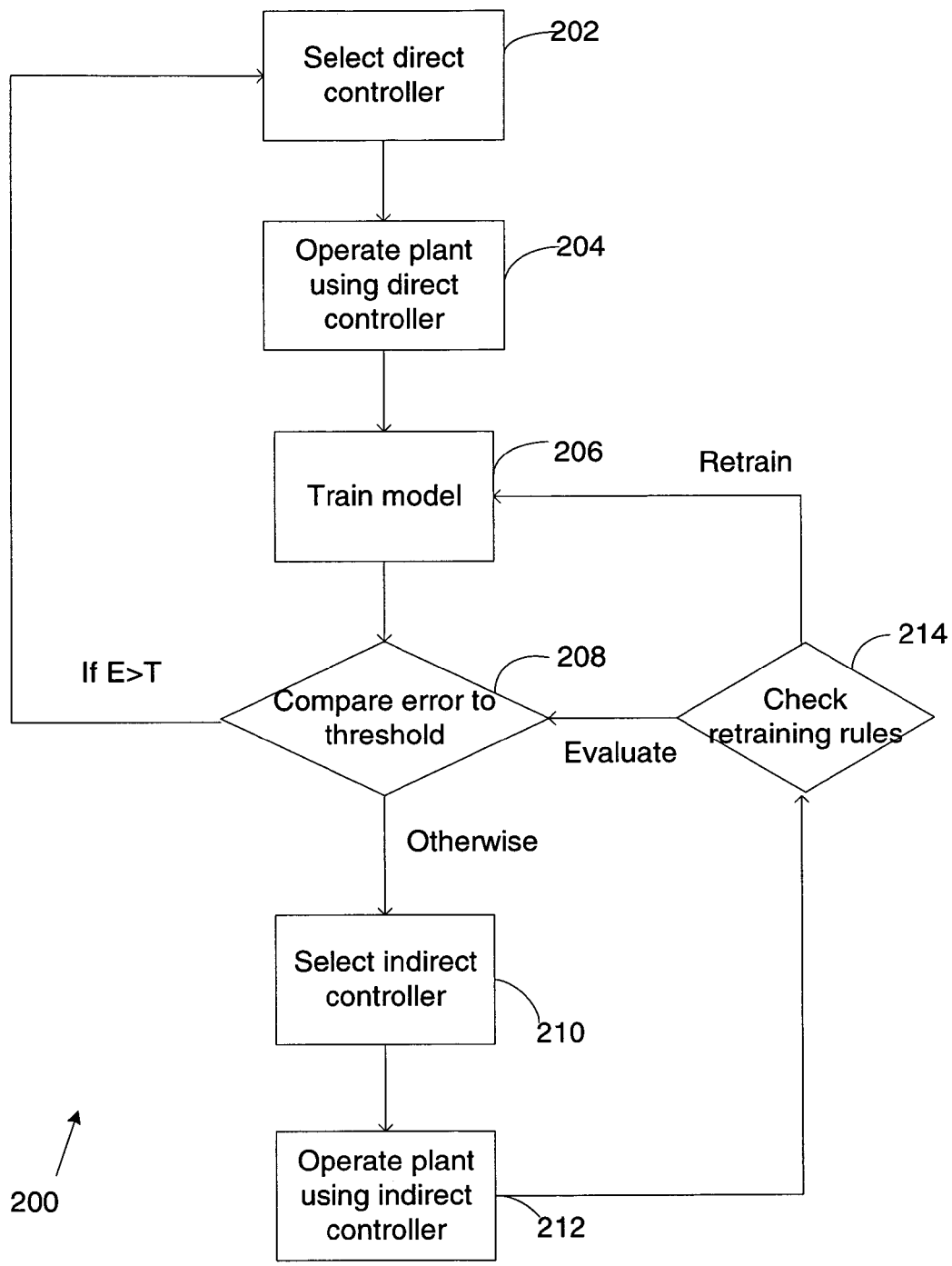
FIG. 2 is a flowchart of steps for implementing indirect control with a system model in accordance with an embodiment of the invention.

FIG. 2 illustrates the process for implementing indirect controller 120 in accordance with an embodiment of the invention. Direct controller 130 is useful both for routine operation of plant 110 and for explicitly generating training data for model 122 incorporated in indirect controller 120.

After direct controller 130 is selected to operate plant 110 in step 202, in step 204, direct controller 130 can be operated to generate different sets of plant inputs 112, which constitute training data for model 122, using different paradigms. Generally, it is preferable that the data collection for model adaptation be as thorough as possible, with inputs 112 being tested through a range of values and combinations of values. Implementing indirect controller 120 in an operating plant typically involves an interruption in the operation of the plant and a diversion of plant resources, particularly to develop training data for model 122. The interruption is significantly reduced by automation of the data collection process, e.g., control by direct controller 130, as compared with human control of the data collection process. Although historical data about the routine operation of plant 110 can be used as training data for the model 122, data from routine operation of plant 110 may not be sufficient to train a particularly accurate and robust model. Historical data from routine operation of plant 110 may not explore the multidimensional, highly complex space defined by the numerous inputs 112 to plant 110 thoroughly enough to train model 122 within a desired degree of accuracy. One way to address the training data requirements is to manipulate plant inputs 112 in the desired space using direct controller 130.

To generate training data, a design of experiments, or automated parametric search, is performed in closed-loop on plant 110. One method for generating data is an exhaustive approach. Each plant input 112 can be varied independently, while the others are held constant to obtain data about its effects on the performance of the plant. For each vector of inputs 112 to plant 110, each trial requires waiting for trial inputs 112 to propagate through plant 110 and then observing the outputs of plant 110, before running a new trial. Running an exhaustive search, namely sampling a statistical number of data points at each unique vector of input variable values is, however, impractical. A number of techniques may be used to reduce the problem complexity, to provide solutions that are more practical to implement. These solutions include reduction of the number of input variables and reduction of the number of data samples taken at any point along the input variable continuum of values.

One technique for reducing the number of input variables involves identification and removal of correlated input variables. Although many of inputs 112 may be interrelated in very complex ways, many of inputs 112 may also be highly correlated. For example, two inputs may track each other closely; they may change in conjunction with each other or may never change. Of the two correlated variables, one usually tracks, or follows the motion of, due to a causal relationship, another. Only one of the correlated variables need be used as an input to the model, as the other input will show an identical relationship with the modeled variable. A controller often decouples the two inputs and has separate control signals for both of them, treating them as independent inputs. If the two inputs were known to be correlated a priori, that information could be built into the controller, for example by eliminating one of the inputs and could save significant testing time. An alternative method for enhancing the search through the control variable values is to avoid moving the correlated variables independently, namely, if one is moved, the other is also moved by an amount commensurate with its correlation.

In some embodiments, one technique for reducing the number of data points sampled at each point along each of the chosen input variables involves focusing the data collection to specific areas of the input vector space using exploratory optimization. A thorough mapping of the space defined by inputs 112 is especially significant around optimal input values. By focusing data collection to these areas, the number of different input values that need to be sampled for each input variable can be greatly reduced and the number of data points collected at many of the remaining input values can be reduced. One method for training neural networks and other models is applying historical data as training inputs, measuring the error in the predicted outputs for sets of training inputs, and backpropagating based on the error. This error-driven learning process is more successful when the error for any particular trial is small, allowing the weights in the neural network, for example, to be finely tuned as a result of the trial. Exploratory optimization, which is more suited to online data collection than to historical data collection, involves starting with plant 110 running at a particular point, varying each input 112 within a neighborhood around that point and measuring its response. Historical data may be suitable when the detail and levels of sampling at each of the input vector values are sufficient for exploratory optimization. The best response is chosen for that variable, and the process is repeated for each variable and is then iteratively repeated. Plant 110 is slowly moved through the multidimensional space, i.e., the operating space of possible inputs with each variable being set for best response at each iteration, thus continually moving the plant operation toward improved performance. This approach focuses on mapping a space around the optimal performance. Small perturbations in the inputs allow a determination of whether the direction of change leads to an improvement in the performance. If the direction of change shows a tendency to improve the output, then the inputs can continue to be varied in that direction. Otherwise, an alternative direction can be tried. Generally, inputs 112 are varied by small amounts until the ideal or acceptable performance under those variables is reached. This approach can be effective and practical because although only a subspace of the entire space is mapped, saving time, the critical points are covered, providing valuable data for training model 122. Regular searches in the vicinity of the optimum input space are desirable and help to identify the evolution of optimum settings. This technique can be implemented as a zero or first order search method and may lead to rapid convergence to local extrema. First order search methods can be used in combination with zero order, second order, or first principle search methods to locate the global extrema out of the set of local extrema. Examples of such complementary search methods are jumps of random distance and direction from such extrema followed by application of first order search techniques.

Using a suitable paradigm for developing test inputs 112, direct controller 130 runs plant 110 through a series of trials, while model 122 observes inputs 112 and outputs 114, and trains on the data in step 206. Outputs 134 of direct controller 130 may be provided directly to indirect controller 120 as inputs 126. Model 122 is designed, at least in part, to predict plant outputs 114 based on plant inputs 112 and the plant operating conditions. Initially, model 122 is not trained and its predictions will be virtually meaningless. As model 122 adjusts its weights, its ability to predict plant outputs 114 will improve. Model 122 can be tested from time to time to determine whether it has attained a desired degree of accuracy. In step 208, the error between the model prediction and actual plant outputs 114 is measured. There are a number of errors that may be measured in step 208. One type of error is the overall model error, which represents the summation of model output/plant output error over all input vectors. The overall error is an indication of the overall model's general applicability, quality of plant representation, and integrity. It is generally desirable that the overall error be low. The overall error is of primary concern during the initial training of the model. A second type of error is the local model error, which is a subset of the overall model error, and represents the summation of model output/plant output error over all input vectors in the local input vector space surrounding the current control point setting. The local error is of little concern during the initial training of the model because of the initially high statistical error present in any small region of the model. The local model error is of primary concern during later training stages, after the overall error is within some acceptable threshold. In step 208, using the current operating conditions and the current inputs 112 selected by direct controller 130, the model's predictions regarding plant outputs 114 can be compared with the actual plant output 114. If the error in the predictions is below a threshold of acceptable error, then model 122 can be deemed to have been sufficiently trained. As long as model 122 fails to satisfy the threshold performance requirement, additional data can be generated and training can continue to be provided. In embodiments of the invention, model error can be used in conjunction with other decision metrics, such as the current state of the indirect controller, and compatibility with predefined safety or other operating constraints of the plant, in order to determine whether indirect controller 120 should be used.

The number of decision variables, the complexity of the data, and the naturally noisy and often uncertain nature of physical plant data can make the decision making task too complex for a complete quantitative representation. Although a specific error threshold may be provided to evaluate the integrity of the model, fuzzy logic is a form of decision technology that is also suited to measuring the integrity by balancing the tradeoffs of considering multiple forms of error and/or other factors.

In step 210, when model 122 has sufficient integrity to satisfy the plant requirements, i.e., when model 122 has been sufficiently trained, indirect controller 120 with model 122 is automatically enabled to replace direct controller 130. Subsequently, in step 212, indirect controller 120 operates plant 110. In general, starting at the current operating point, indirect controller 120 determines the sequence of plant inputs 112 required to reach the desired plant output within a desired number of steps. Indirect controller 120 uses system model 122 to identify a plant operating point that corresponds to plant performance objectives, given the current plant operating conditions, and then identify the plant control settings for inputs 112 at that plant operating point. Using the current plant control settings and the desired plant control settings, indirect controller 120 determines an appropriate sequence of control moves, within the constraints of plant 110 and desired number of steps. Indirect controller 120 transmits a control move to adjust the control settings for plant inputs 112 to modify the state of plant 110. After each step, the then current outputs 114 are used as data and a new control sequence is initiated. That plant input 112 and output 114 data is continuously stored, in part for use in adapting the system model or building new system models.

Another aspect of the present invention is maintaining the effectiveness of indirect controller 120. During the period under indirect control, maintenance of the model integrity is desirable. In operation, although model 122 is checked for integrity prior to implementing the indirect controller, the performance of model 122 may be poor, for example, due to local errors, affecting certain operating regions, or due to long-term changes in the operation of the plant occurring since the training of model 122. Once indirect control has been implemented, the device remains under indirect control unless evaluation by the error compare step 208 falls below a threshold, that is, when the performance falls below a desired level of accuracy. Step 214 indicates that the system incorporates retraining rules that determine when to evaluate or retrain model 122. The periodic retraining of the model 122 (e.g., every 24 hours) may be desirable, depending upon available system resources as specified by the retraining rules in step 214. A new model or retraining of the existing model may occur offline, namely in such a way that preexisting model 122 is used and maintained within indirect controller 120, during the build model step 206. As indicated in step 208, the performance of model 122 can also be re-evaluated from time to time. If the error of model 122, measured as a correlation or a standard error for example, is greater than is acceptable indirect controller 120 can be automatically disabled and direct controller 130 can be activated to replace it, in steps 206 and 208. Model 122 can then be retrained until it attains a sufficient level of accuracy.

When the indirect control has been turned off as a result of unacceptable model error, it is desirable for system model 122 to be retrained by processing data from the control region where the error is high. If the automated control system is turned off completely and a human is controlling the plant input parameters, then it may be difficult to ensure that the plant conditions will remain in the region where data needs to be collected. Therefore, it is difficult to ensure that model 122 will have an opportunity to adapt to the control region where the error was originally high. As a result, when plant 110 is brought to the same operating region, model 122 may not be able to control the plant operations to within the acceptable error limits. Accordingly, some embodiments of the invention implement a control strategy in which, when model 122 needs retraining, direct controller 130 assumes control and continues to amass data regarding the high error region of control by operating plant 110 in that region and feeding that data back to model 122 of indirect controller 120 so that it may be incorporated into model 122, with the objective of bringing the model error to within limits that are acceptable for indirect control.

Rather than a single neural network or other model as system model 122, the model-based controller 120 can actually incorporate several neural networks or other models that have all been trained on the plant operation data to function as system model 122 for indirect controller 120. These models form a committee of models. The models may all have the same architecture or may have different architectures. For example, all of the models in the committee may be neural network models, or the models may be a mix of neural network models and genetically programmed models. In general, variations between the models are a reflection of the statistical variance in the modeling process. For statistical significance, a committee of models may contain, for example, ten models. Indirect controller 120 uses data about predicted plant performance from the committee to determine its control action. In certain embodiments, a subset of the committee, preferably the models having the highest integrity, is selected for operational use in the period up to the next selection event. In certain embodiments, the subset is chosen to be all those models whose error is below a threshold value. In one embodiment, the error threshold itself is a dynamic value that automatically decreases to enable higher fidelity results under conditions where the preexisting threshold does not differentiate the top models from the bottom models. In certain embodiments, each system model that constitutes a member of the committee of models is evaluated for accuracy on a regular and specifiable basis. The evaluation phase ranks each of the models against each other, so that the best model is given the highest rank and the worst model is ranked last. In certain embodiments, the top ranked subset of the committee is used for system control up until the next ranking occurs, at which point the new operative subset of the committee can be substituted. In various embodiments, the ranking considers the overall model error or a similar statistical measure of model-data correlation, such as the model's correlation coefficient.

In a contemplated embodiment, each member of the committee selected for operational use is evaluated for each control move that is made during the control period until the next selection event. In particular, the following steps may be executed prior to a control move. Each of the system models that together constitute the operative committee is evaluated to determine the plant operating point corresponding to the plant performance objective and the corresponding control variable settings. The resulting vectors of possible control settings are used to check the integrity of the committee of models. In one embodiment, a confidence interval is determined around the distribution of plant operating points and corresponding control variable settings from each of the models. A high confidence interval indicates that a large fraction of the measured population is within the specified data range. The ratio between the full data range for the objective variable and the data range of the confidence interval is evaluated and referred to as the confidence ratio. In one contemplated embodiment, a confidence ratio is used to evaluate the statistical confidence in the set of results presented by the operative committee of models. A pre-specified threshold value for the confidence ratio is used for comparison against the calculated confidence ratio. If the calculated confidence ratio satisfies the threshold, then the operative committee has sufficient integrity at that operating point to be used for control of the plant. In one contemplated embodiment, the optimized control settings from each system model in the operative committee are averaged together to derive a single vector of optimized control settings. Indirect controller 120 then implements this single vector of optimized settings in the subsequent control moves.

If the calculated confidence ratio is less than the pre-specified threshold, a sequence of steps is initiated in certain embodiments. First, plant control is redirected to direct controller 130. In one contemplated embodiment, direct controller 130 is notified of the confidence ratio, confidence interval, and model error for each member of the committee. Direct controller 130 identifies a range of controllable input data over which the confidence interval is low, as specified by the received information. In the preferred embodiment, direct controller 130 uses the range of controllable data over which the confidence interval was low as a constraint for operation. In particular, in one contemplated embodiment, direct controller 130 maintains control of plant 110 within or proximate to the bounds of that data range. If control of plant 110 in said data range violates a priority constraint, such as safety or high NOx, opacity, or CO, then operation may be shifted to another range of control. In one embodiment, operation is maintained within said data range so as to both optimize plant objectives as well as to collect operational data to be used for training of the system models used by indirect controller 120.

In the committee embodiment, once the plant 110 is running under indirect control, the models can be periodically retrained, e.g., every 24 hours. In doing this retraining, new models are obtained and constantly compared to the committee of models. When a new model is found to be better than one or more of the committee members, the worst committee member can be replaced with the new model. Also, model correlation, standard error and committee confidence (e.g., using random samples) can be recalculated periodically, for example daily, based on measured data about the actual performance of the plant, as compared with the performance predicted by the committee and individual models in the committee. The use of confidence intervals is one approach used to check the integrity of the committee of models in embodiments of the invention.

In the preferred embodiment, after transferring control of the plant to the direct controller, the indirect controller uses the new operational data collected by the direct controller to retrain the system models. After training, the model error, confidence interval, and confidence ratios are reevaluated and compared to the prior values. If the new confidence ratio is greater than the confidence threshold, then control is shifted from the direct controller back to the indirect controller. If the new confidence ratio is equal to or less than the threshold, then control is maintained by direct controller 130 and new control data is measured and incorporated into model 122, and the process repeated.

Model errors may have a number of causes, which may be classified as resulting from either random or systematic events. One type of random error may result when there is a lack of adequate adaptation of the model due to insufficient data sampling. In embodiments of the invention, this particular error may be rectified by sampling more data and iterating the adaptation methods of the models. An example of error that results from systematic events is that which can occur when first order search algorithms, mentioned above, are used to train the system model and where a local minimization of the cost function has occurred, rather than a global minimization. In embodiments of the invention, this type of error may be rectified by creating a new model or by reinitializing the weights of an existing model. In certain embodiments using a committee of models, it is possible to evaluate the source of error as statistical or systematic and, furthermore, to select the appropriate form of correction. In embodiments of the invention, correction may involve collection of more data or removal of sources of systematic error, such as locally minimized models. In certain contemplated embodiments, a decision tree implements various strategies for improving the performance of the models using performance measures to determine initially the quality of the models. The correlation of the models in the committee, and the confidence interval and distribution of the committee are determined. If the correlation of each model is very bad, then the errors are statistical: retraining can be used to improve the quality of the models. If the confidence ratio is very bad, then the errors are systematic: then one solution may be to eliminate one or more models from the committee or the operative committee. Another solution may be to switch to direct control. Identifying the correct form of error correction is desirable.

In certain embodiments, the present invention can be implemented in software and operated on a computer including a processor, computer memory, storage, and input and output devices. The software can monitor the accuracy of the model 122 or a committee of models and initiate the transfer of plant operation to or from the indirect controller 120 when appropriate. The software can also operate the direct controller 130 to select control values for the plant 110.

The invention is generally applicable to any type of plant. Other paradigms for generating training data may be used. While the present invention has been illustrated and described with reference to preferred embodiments thereof, it will be apparent to those skilled in the art that modifications can be made and the invention can be practiced in other environments without departing from the spirit and scope of the invention, set forth in the accompanying claims.

What is claimed is:

1. A computer-implemented method for implementing an indirect controller with a system model in a plant operable for performing a process, the plant having a plurality of inputs, the inputs being manipulable by a controller to operate the plant, a particular combination of inputs received by the plant defining an operating region, comprising:
   using the indirect controller to operate the plant;
   detecting that the performance of the system model is low;
   using a direct controller instead of the indirect controller to operate the plant by maintaining operation around a particular operating region corresponding to detecting that the performance of the system model is low;
   adapting the system model;
   detecting that the performance of the system model is acceptable; and
   selecting the indirect controller to operate the plant.

2. The method of claim 1, wherein fuzzy logic is used for detecting that the performance of the system model is low or detecting that the performance of the system model is acceptable.

3. The method of claim 1, wherein a threshold is used for detecting that the performance of the system model is low or detecting that the performance of the system model is acceptable.

4. The method of claim 1, wherein an overall error is used for detecting that the performance of the system model is low or detecting that the performance of the system model is acceptable.

5. The method of claim 1, wherein a local error is used for detecting that the performance of the system model is low or detecting that the performance of the system model is acceptable.

6. The method of claim 1, wherein maintaining operation around a particular operating region is coordinated with operating constraints, including satisfying a plant performance objective.

7. The method of claim 1, wherein the system model is implemented as a neural network.

8. The method of claim 1, wherein the system model is implemented using genetic programming.

9. A computer program product, residing on a computer readable medium, for use in implementing an indirect controller with a system model in a plant operable for performing a process, the plant having a plurality of inputs, the inputs being manipulable by a controller to operate the plant, a particular combination of inputs received by the plant defining an operating region, the computer program product comprising instructions for causing a computer to:
   select the indirect controller to operate the plant;
   detect that the performance of the system model is low;
   select a direct controller instead of the indirect controller to operate the plant by maintaining operation around a particular operating region corresponding to detecting that the performance of the system model is low;
   adapt the system model;
   detect that the performance of the system model is acceptable; and
   select the indirect controller to operate the plant.

10. The computer program product of claim 9, wherein the instructions cause the computer to detect that the performance of the system model is low using fuzzy logic.

11. The computer program product of claim 9, wherein the instructions cause the computer to detect that the performance of the system model is low using a threshold of acceptable performance.

12. The computer program product of claim 9, wherein the instructions cause the computer to detect that the performance of the system model is low using an overall error.

13. The computer program product of claim 9, wherein the instructions cause the computer to detect that the performance of the system model is low using a local error.

14. The computer program product of claim 9, wherein the instructions cause the computer to instruct the controller to maintain operation around a particular operating region coordinated with operating constraints, including satisfying a plant performance objective.

15. A system for implementing indirect control in a plant operable for performing a process, the plant having a plurality of inputs subject to control to operate the plant, a particular combination of inputs received by the plant defining an operating region, comprising:
   means for modeling the operation of the plant;
   means for providing indirect control of the plant;
   means for providing direct control of the plant, including means for maintaining operation around a particular operating region;
   means for evaluating the performance of the means for modeling the operation of the plant;
   means for selecting indirect control or direct control to operate the plant based on the evaluated performance of the means for modeling the operation of the plant; and
   means for adapting the means for modeling the operation of the plant.

* * * * *